(12) United States Patent
Smileysky

(10) Patent No.: US 10,972,886 B2
(45) Date of Patent: Apr. 6, 2021

(54) DYNAMIC ANTENNA ARRAY PATTERN SWITCHING IN WIRELESS SYSTEMS

(71) Applicant: Cypress Semiconductor Corporation, San Jose, CA (US)

(72) Inventor: Victor Smileysky, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 50 days.

(21) Appl. No.: 16/294,586

(22) Filed: Mar. 6, 2019

(65) Prior Publication Data

US 2020/0178054 A1 Jun. 4, 2020

Related U.S. Application Data

(60) Provisional application No. 62/775,012, filed on Dec. 4, 2018.

(51) Int. Cl.

| | |
|---|---|
| *H04W 4/80* | (2018.01) |
| *H04W 64/00* | (2009.01) |
| *H04B 17/318* | (2015.01) |
| *H04B 17/336* | (2015.01) |
| *H04W 24/10* | (2009.01) |

(52) U.S. Cl.
CPC ............ *H04W 4/80* (2018.02); *H04B 17/318* (2015.01); *H04B 17/336* (2015.01); *H04W 24/10* (2013.01); *H04W 64/006* (2013.01)

(58) Field of Classification Search
None
See application file for complete search history.

(56) References Cited

U.S. PATENT DOCUMENTS

| | | |
|---|---|---|
| 6,252,867 B1 | 6/2001 | Pfeil et al. |
| 7,502,619 B1 | 3/2009 | Katz |
| 7,577,464 B2 | 8/2009 | Ezal et al. |
| 8,478,880 B2 | 7/2013 | Finkelstein et al. |
| 8,548,386 B1 | 10/2013 | Zhou |
| 8,942,772 B2 | 1/2015 | Yan et al. |
| 9,231,686 B2 | 1/2016 | Chen et al. |
| 9,270,022 B2 | 2/2016 | Zhang et al. |
| 9,548,805 B2 | 1/2017 | Moshfeghi |
| 9,820,209 B1 | 11/2017 | Agee et al. |
| 9,923,657 B2 | 3/2018 | Forenza et al. |

(Continued)

OTHER PUBLICATIONS

International Search Report for International application No. PCT/US2019/059252 dated Jan. 27, 2020, 2 pages.

(Continued)

*Primary Examiner* — Jason E Mattis
*Assistant Examiner* — Hong Shao

(57) ABSTRACT

An example method of operating a device includes using a switching circuitry to a first subset of antennas from an antenna cluster, using the first subset of antennas to receive a first Bluetooth signal, generating a first directional value of the first Bluetooth signal, using a processing element to evaluate at least one antenna of the antenna cluster based at least partly on the first directional value, selecting a second subset of antennas based on evaluation, using the second subset of antennas to receive a second Bluetooth signal, and generating a second directional value of the second Bluetooth signal. Other embodiments of the device and operations thereof are also disclosed.

21 Claims, 11 Drawing Sheets

(56) References Cited

U.S. PATENT DOCUMENTS

| | | |
|---|---|---|
| 10,129,878 B2 | 11/2018 | Sharma et al. |
| 2011/0019599 A1 | 1/2011 | Wood et al. |
| 2011/0250926 A1 | 10/2011 | Wietfeldt et al. |
| 2013/0210345 A1 | 8/2013 | Ling et al. |
| 2013/0260688 A1 | 10/2013 | Patin et al. |
| 2013/0285855 A1 | 10/2013 | Dupray et al. |
| 2015/0304941 A1 | 10/2015 | Syrjarinne et al. |
| 2016/0105761 A1* | 4/2016 | Polo ........................ H04W 4/80 455/41.2 |
| 2017/0332304 A1* | 11/2017 | Agee ................... H04L 27/2605 |
| 2018/0331714 A1 | 11/2018 | See et al. |

OTHER PUBLICATIONS

Written Opinion of the International Searching Authority for International application No. PCT/US2019/059252 dated Jan. 27, 2020, 4 pages.

Wielandt, Stijn, "Indoor Multipath Assisted Angle of Arrival Localization," Sensors 2017, vol. 17, No. 2522, Nov. 2, 2017, pp. 1-29; 29 pages.

\* cited by examiner

DYNAMIC ANTENNA ARRAY PATTERN SWITCHING IN WIRELESS SYSTEMS

PRIORITY

The present application claims the priority and benefit under 35 U.S.C. § 119(e) of U.S. Provisional Application No. 62/775,012, filed on Dec. 4, 2018, which is incorporated by reference herein in its entirety.

TECHNICAL FIELD

The present disclosure relates generally to wireless device/system connectivity issues. More particularly, it relates to antenna array or cluster dynamic pattern switching embodiments and method of operation thereof.

BACKGROUND

Computing devices may communicate with each other via networks, such as wireless networks (e.g., Wi-Fi networks, Bluetooth networks, etc.). A computing device may communicate with another device (e.g., another computing device) in the wireless network by transmitting radio-frequency (RF) signals to and/or receiving RF signals from one another. Those devices within the wireless network may also utilize the transmitted/received RF signals to generate relative directional data of each other. One of the techniques is using Angle of Arrival (AoA) or Angle of Departure (AoD) estimation to help generate those data. Existing designs and techniques for estimating AoA or AoD face various challenges such as backward compatibility issues and demands to increase accuracy and to reduce cost, footprint, operation time, and power consumption.

BRIEF DESCRIPTION OF THE DRAWINGS

The present disclosure is illustrated by way of example, and not by way of limitation, in the FIGS. of the accompanying drawings.

DETAILED DESCRIPTION

Figure 1:
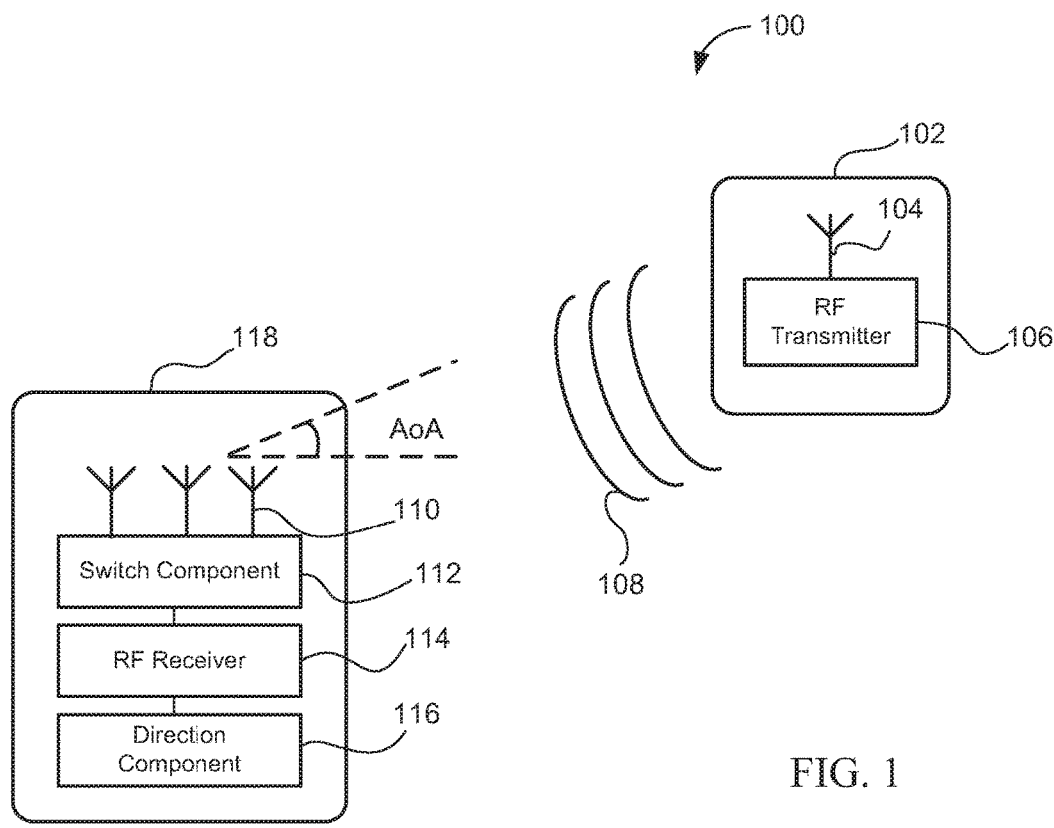
FIG. 1 is a schematic diagram illustrating wireless devices using AoA estimation techniques in accordance with one embodiment of the subject matter.

The following description sets forth numerous specific details such as examples of specific systems, components, methods, and so forth, in order to provide a good understanding of several embodiments of the subject matter. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the subject matter.

Unless specifically stated otherwise, as apparent from the following discussions, it is appreciated that throughout the specification discussions utilizing terms such as "generating", "detecting", "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

SUMMARY OF SUBJECT MATTER

The examples, implementations, and embodiments described herein may adopt dynamic switching techniques to alter an antenna cluster pattern to improve relative direction estimation precision, power conservation, and latency reduction.

According to one embodiment, a method of the subject matter may include the steps of using a switching circuitry to select a first subset of antennas from an antenna cluster and to form a first pattern, using the first subset of antennas to receive a first Bluetooth signal, generating a first directional value of the first Bluetooth signal, using a processing element to evaluate at least one antenna of the antenna cluster based at least partly on the first directional value, using the switching circuitry to select a second subset of antennas from the antenna cluster based on results of the evaluating the at least one antenna, to form a second pattern, which is different from the first pattern, using the second subset of antennas to receive a second Bluetooth signal, and generating a second directional value of the second Bluetooth signal.

In one embodiment, the aforementioned method may also include the steps of using the processing element to evaluate at least one antenna that is not included in the second pattern based at least partly on the second directional value of the second Bluetooth signal, adding at least one antenna based on results of the evaluation to the second subset of antennas to form a third subset, using the third subset of antennas to receive a third Bluetooth signal, and generating a third directional value of the third Bluetooth signal.

In one embodiment, the first and second Bluetooth signals may be Bluetooth Low Energy (BLE) signals including Constant Tone Extension (CTE).

In one embodiment, the first and second directional values may include an angle of arrival (AoA) associated with the first and second Bluetooth signals, respectively.

In one embodiment, the second pattern may include fewer antennas than the first pattern.

In one embodiment, the step of evaluating at least one antenna of the antenna cluster may also include the steps of generating and comparing one or more contribution factor of each antenna in the first pattern. In embodiments, the contribution factors may include at least one of: orientation of antenna pairs in the first pattern against the first directional value, polarity, Received Signal Strength Indicator (RSSI), and Signal-to-Noise Ratio (SNR), of the first Bluetooth signal.

In one embodiment, the step of selecting the second subset of antennas may also include deselecting at least one antenna from the first subset of antennas to form the second subset of antennas.

In one embodiment, antenna pairs in the first subset of antennas that have an orientation within a predetermined threshold value to 90° or 270° against a propagation direction of the first Bluetooth signal may be selected to form the second subset of antennas.

In one embodiment, the aforementioned method may also include the step of notifying a wireless device transmitting the first Bluetooth signal to shorten a duration of CTE in the second Bluetooth signal.

According to another embodiment of the present disclosure, an apparatus may include a transceiver, a switching circuitry configured to couple to an antenna cluster, in which the switching circuitry may be further configured to couple at least one antenna of the antenna cluster to the transceiver, and a processing element that may be configured to cause the switching circuitry to couple a first subset of antennas of the antenna cluster to the transceiver to receive a first Bluetooth signal, generate a first angle of arrival (AoA) estimation of the first Bluetooth signal, cause the switching circuitry to couple a second subset of antennas of the antenna cluster, based at least partly on the first AoA estimation, to the transceiver to receive a second Bluetooth signal, in which the first and second subsets of antennas are different from one another, and generate a second AoA estimation of the second Bluetooth signal.

In one embodiment, the processing element may be further configured to cause the switching circuitry to couple a third subset of antennas, based at least partly on the second AoA estimation, to the transceiver to receive a third Bluetooth signal, and generate a third AoA estimation of the third Bluetooth signal. In another embodiment, the processing element may also be configured to evaluate each antenna in the first subset based on its one or more contribution factor in generating the first AoA estimation.

In one embodiment, the contribution factors may include at least one of: orientation of antenna pairs in the first subset against a propagation direction of the first Bluetooth signal based on the first AoA estimation, polarity, Received Signal Strength Indicator (RSSI), and Signal-to-Noise Ratio (SNR), of the first Bluetooth signal.

In one embodiment, the processing element may also be configured to evaluate at least one antenna that is not in the second subset based on its one or more contribution factor in generating the second AoA estimation. In embodiments, the contribution factors may include at least one of: orientation of antenna pairs that is not in the second subset against propagation direction of the second Bluetooth signal, polarity, Received Signal Strength Indicator (RSSI), and Signal-to-Noise Ratio (SNR), of the second Bluetooth signal.

In one embodiment, the first and second Bluetooth signals may be Bluetooth Low Energy (BLE) signals including Constant Time Extension (CTE).

In one embodiment, the second subset may include fewer antennas than the first subset.

According to another embodiment of the present disclosure, a wireless device may include an antenna cluster that may have at least three antennas, a transceiver, a switching circuit that may be configured to couple at least two antennas of the antenna cluster to the transceiver to form an antenna subset, and a processing element that may be configured to generate a first AoA estimation of a first Bluetooth signal received by a first antenna subset, cause the switching circuit to deselect at least one antenna from the first antenna subset to form a second antenna subset, based at least partly on the first AoA estimation, and generate a second AoA estimation of a second Bluetooth signal received by the second antenna subset.

In one embodiment, the first and second Bluetooth signals may be Bluetooth Low Energy (BLE) signals including Constant Time Extension (CTE).

In one embodiment, the transceiver may have a single radio configuration, and the switching circuit may be configured to couple one antenna to the transceiver at a time to form the antenna subset.

In one embodiment, the processing element may be further configured to cause the switching circuit to add at least one antenna that is not in the second antenna subset based at least partly on the second AoA estimation, to form a third antenna subset, and generate a third AoA estimation of a third Bluetooth signal received by the third antenna subset.

In one embodiment, the antenna cluster may be configured to be one of: a linear pattern, a circular pattern, and an oval pattern.

FIG. 1 is a schematic diagram illustrating a wireless network 100 including wireless devices using AoA method to determine relative directions according to one embodiment of the present disclosure. Referring to FIG. 1, wireless device 102 is transmitting RF signals 108 to wireless device 118. Wireless devices 102 and 118 may be any wireless device communicating with each other via a wireless network. The wireless network 100 may be a public network (e.g., the internet), a private network (e.g., a local area network (LAN) or wide area network (WAN)), or a combination thereof. In one embodiment, the wireless network 100 may include a wireless infrastructure, which may be provided by one or more wireless communications systems, such as a wireless fidelity (Wi-Fi) access point or hotspot, connected with the network and/or a wireless carrier system that can be implemented using various data processing equipment, communication towers (e.g. cell towers), etc. In other embodiments, the network 100 may be a personal area network, such as a Bluetooth network, a Bluetooth Low Energy network, a ZigBee network, a Z-Wave network, etc.

The wireless network 100 may carry communications (e.g., data, message, packets, frames, etc.) between wireless devices 102 and 118. As an example, wireless devices 102 and 118 are Bluetooth Low Energy (BLE) devices wherein one device, such as wireless device 102, may make its direction available to a peer device, such as wireless device 118, by transmitting packet(s) attached with a directional finding component, such as constant tone extension (CTE), using a single antenna or multiple antennas (not shown in FIG. 1). In one embodiment, wireless device 102 may include antenna 104 and RF transmitter 106. Wireless device 118 may include antenna cluster or array 110, RF switch component 112, RF receiver 114, and direction component 116. RF switch component 112 switches antennas within antenna array 110 while receiving RF signals 108 and captures the I and Q samples. In embodiments, RF receiver 114 may include one or more radio receivers. The I and Q samples may be used by direction component 116 to estimate an AoA of received RF signals 108.

Figure 2:
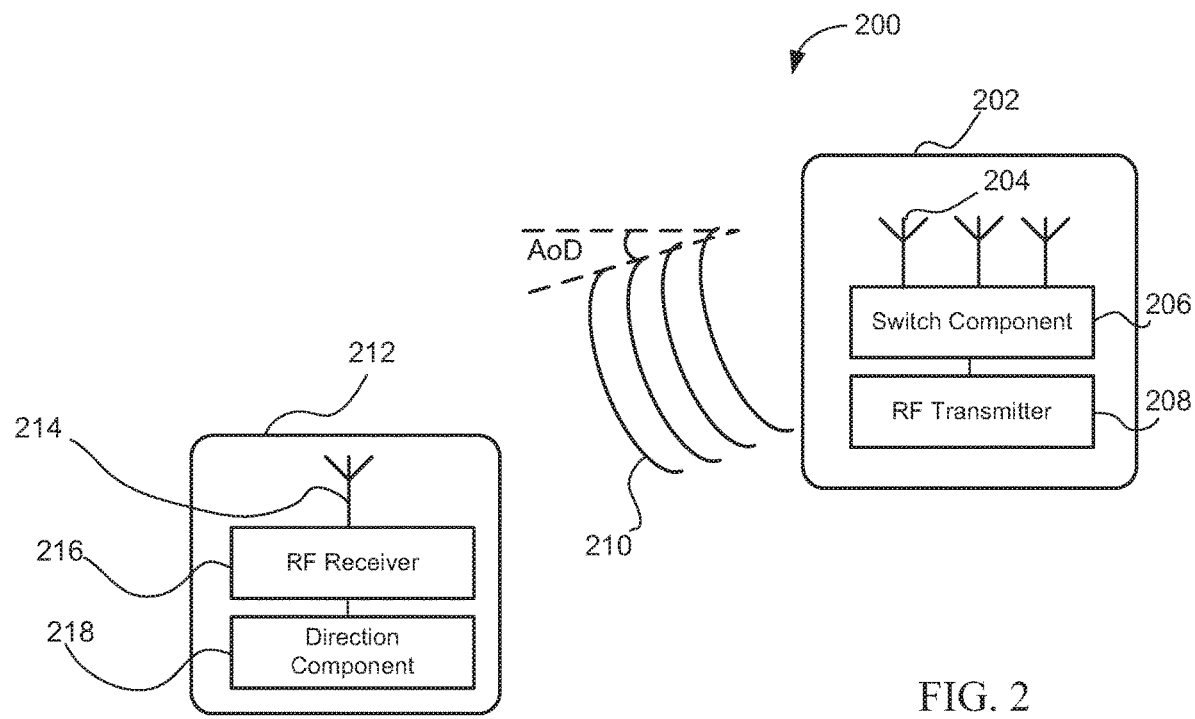
FIG. 2 is a schematic diagram illustrating wireless devices using AoD estimation techniques in accordance with one embodiment of the subject matter.

FIG. 2 is a schematic diagram illustrating a wireless network 200 including wireless devices using AoD method to determine relative directions according to one embodiment of the present disclosure. Similar to FIG. 1, wireless device 202 may include RF switch component 206 to periodically using one or more antenna in antenna array 204 to transmit RF signals 210 generated from RF transmitter 208. In one embodiment, wireless device 202 may make the AoD of the RF transmitted signals detectable by transmitting packets with CTE attached during transmission. Wireless device 212 may be a single or multiple antenna (not shown in FIG. 2) embodiment that include RF receiver 216 and direction component 218. Antenna 214 may receive the transmitted packets and captures the I and Q samples during the CTE part of those packets. The I and Q samples may be used by direction component 218 to estimate the AoD with the profile-level information of antenna array 204 on wireless device's 202 side.

In some embodiments, wireless devices 102, 118, 202, 212 featured in FIGS. 1 and 2 may also include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). Wireless devices 102, 118, 202, 212 may also comprise any suitable type of computing device or machine that has a programmable processor including, for example, server computers, desktop computers, laptop computers, tablet computers, smartphones, personal digital assistants (PDAs), set-top boxes, etc. In some embodiments, wireless devices 102, 118, 202, 212 may include a single machine or may include multiple interconnected machines (e.g., multiple servers configured in a cluster). Wireless devices 102, 118, 202, 212 may execute or include an operating system (OS). The OS of wireless devices 102, 118, 202, 212 may manage the execution of other components (e.g., direction, software, applications, etc.) and/or may manage access to the hardware (e.g., processors, memory, storage devices etc.).

Figure 3A:
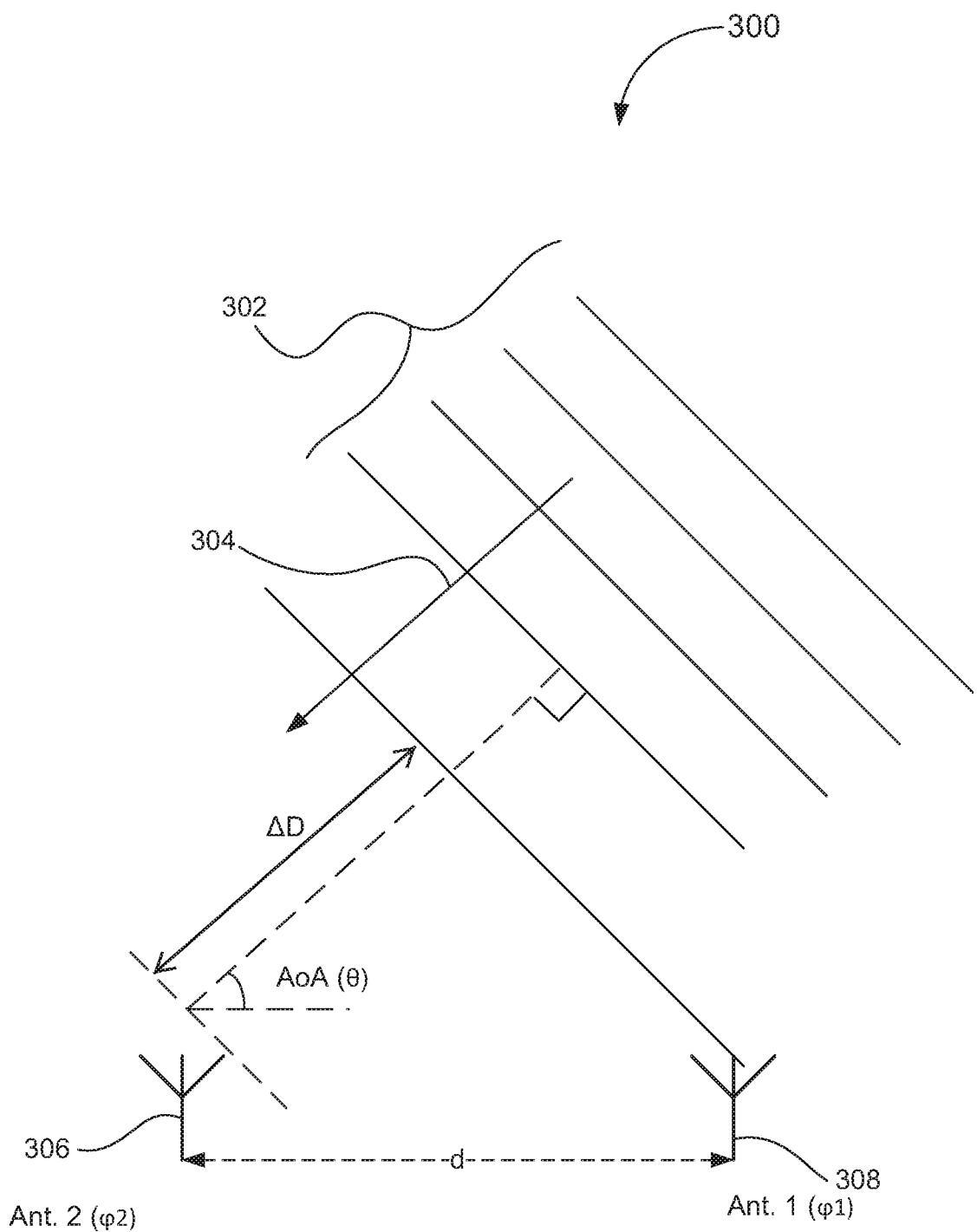
FIG. 3A is a schematic diagram illustrating RF wave propagation model for determining AoA estimation in accordance with one embodiment of the subject matter.

FIG. 3A is a schematic diagram illustrating RF wave propagation model 300 for determining AoA estimation in accordance with one embodiment of the subject matter. As discussed in FIG. 1, a wireless device, such as wireless device 118 may utilize the AoA of received RF signals to determine relative direction information of a peer device, such as wireless device 102. Referring to FIG. 3A, Ant. 1 308 and Ant. 2 306 may be two antennas of an antenna array, such as antenna array 110 in FIG. 1. In various embodiments, Ant. 1 308 and Ant. 2 306 may be a portion of a linear array, a circular array, an oval array, or an array with any other physical configuration and number of antennas known in the art. Ant. 1 308 and Ant. 2 306 may be disposed away from one another by distance (d). RF incoming pattern 302 may be RF signals transmitted by a far-field transmitting antenna, such as antenna 104 in FIG. 1. In embodiments, RF incoming pattern 302 (e.g., the carrier waves) may be modulated to encode messages and/or to define patterns, either streamed or packetized, of a communication protocol. Propagation direction 304 may be the approaching direction of RF incoming pattern 302, and AoA ($\theta$) may be the angle between propagation direction 304 and the plane connecting Ant. 1 308 and Ant. 2 306. As an example and also shown in FIG. 3A, wavefronts of RF incoming pattern 302 may arrive at Ant. 1 308 before Ant. 2 306, and the extra distance that RF incoming pattern 302 travels from Ant. 1 308 to Ant. 2 306 may be represented as path difference ($\Delta D$). AoA may be expressed in the following equation (1):

$$\theta = \cos^{-1}(\Delta D/d) \quad \text{Equation (1)}$$

Path difference ($\Delta D$) may be expressed mathematically by attributes of RF incoming pattern 302, as in equation (2):

$$\Delta D = \lambda/2\pi \times (\varphi 2 - \varphi 1) \quad \text{Equation (2)}$$

where $\lambda$ is the wavelength of RF incoming pattern 302, and $\varphi 1$ and $\varphi 2$ are phase values of RF incoming pattern 302 observed at Ant. 1 308 and Ant. 2 306, respectively. Since wavelength ($\lambda$)=speed of light (c)/frequency (f), AoA ($\theta$) may then be expressed as follow:

$$\theta = \cos^{-1}(c \times (\varphi 2 - \varphi 1)/(2\pi f d)) \quad \text{Equation (3)}$$

As shown above, since c, f, and d are known values, estimation of AoA of RF incoming pattern 302 relative to a plane connecting Ant. 1 308 and Ant. 2 306 may be accomplished by finding out phase difference ($\Delta \varphi$) between RF incoming pattern 302 that is observed/received at Ant. 2 306 and Ant. 1 308 ($\varphi 2 - \varphi 1$).

Figure 3B:
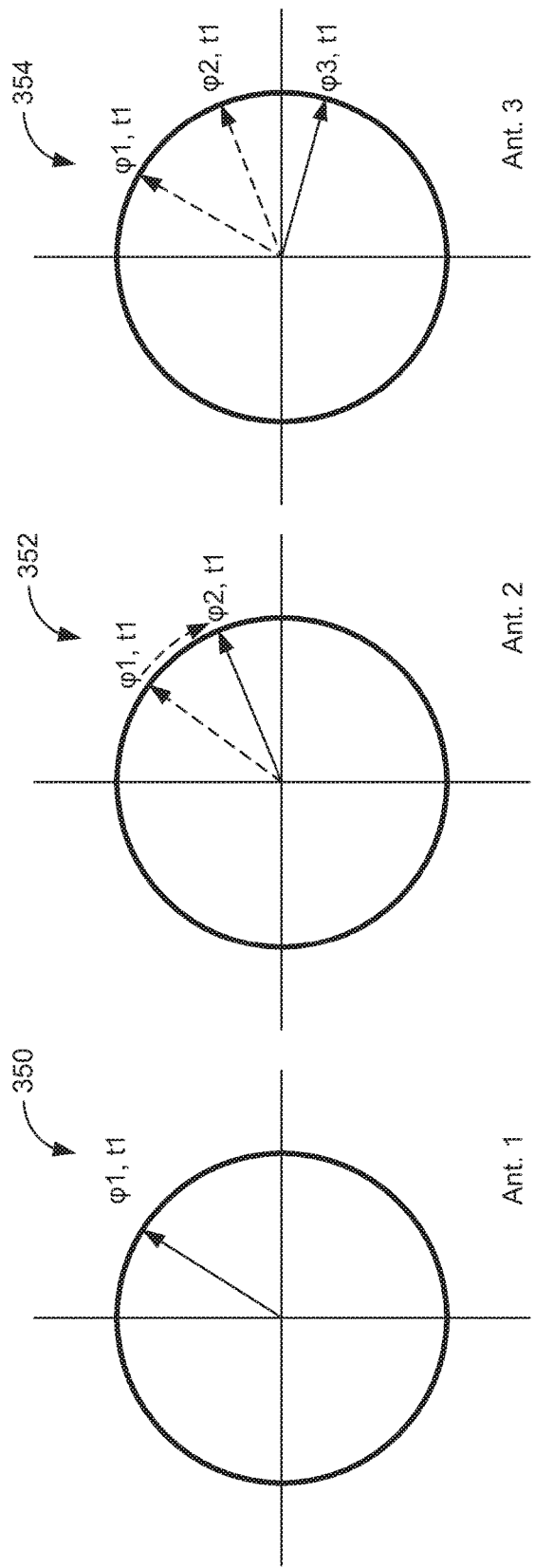
FIG. 3B is a graph diagram illustrating phase differences at individual antennas of an antenna array in accordance with one embodiment of the subject matter.
Figure 3B:
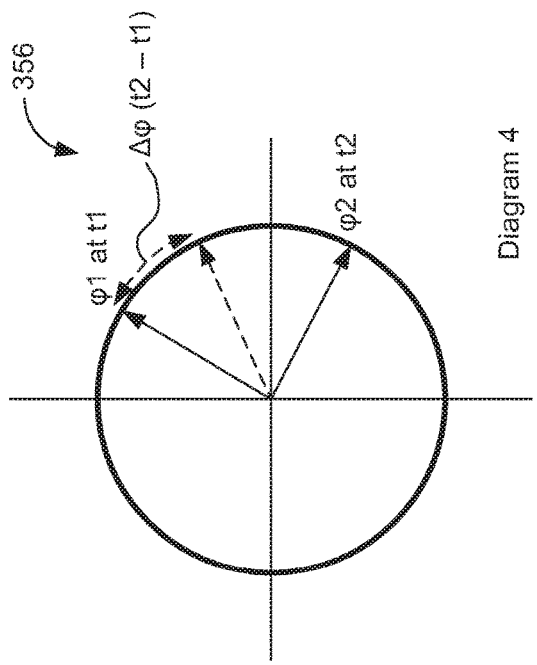

FIG. 3B are graph diagrams illustrating phase differences at individual antennas of an antenna array in accordance with one embodiment of the subject matter. Using Ant. 1 308 of FIG. 3A as an example, Diagram 1 350 of FIG. 3B illustrates phase value (φ1) of Ant. 1 308 at t1 when Ant. 1 308 receives RF incoming pattern 302. Referring to Diagram 2 352 of FIG. 3B, φ2 is the phase value of RF incoming pattern 302 as observed/received on Ant. 2 306 at t1. In one embodiment, wireless device 118 may be a multiple radio solution wherein Ant. 1 308 and Ant. 2 306 are connected to two dedicated radio receivers respectively, such that RF incoming pattern 302 may both be observed on Ant. 1 308 and Ant. 2 306 at t1. Once φ1 and φ2 are obtained, AoA estimation may be generated using phase difference of observed signals on Ant. 1 308 and Ant. 2 306, and Equation (1)-(3), as previously discussed. In some embodiments, antenna arrays, such as antenna array 110, may have more than two antennas. Referring to Diagram 3 354 of FIG. 3B, φ3 represents the phase value of RF incoming pattern 302 observed on Ant. 3 at t1. In one embodiment, Ant. 3 (not shown in FIG. 3B) may be an antenna of the same antenna array featuring Ant. 1 308 and Ant. 2 306, and is connected to its dedicated radio receiver. Ant. 3 may or may not be disposed on the same plane connecting Ant. 1 308 and Ant. 2 306. Once φ3 is determined, phase differences between RF incoming pattern 302 observed on Ant. 1 308 and Ant. 2 306, Ant. 1 308 and Ant. 3, and Ant. 2 306 and Ant. 3 may be generated for AoA estimation. In one embodiment, using multiple antennas for AoA estimation may allow computing component of wireless devices, such as wireless device 118, to improve directional resolution or directional precision when determining AoA of incoming RF signals. In embodiments, an antenna array or cluster may have any number (more than two), any orientation of antennas in any physical configuration or spatial arrangement according to system design and requirements, and phase value data of two or more antennas may be used to generate AoA estimation.

In multi-radio devices, each antenna (e.g. Ant. 1 308, Ant. 2 306, and Ant. 3) is associated with a level of complexity. Not only do the number of transceivers impact the Bill-Of-Materials (BOM) and footprint of the wireless device, but there is a linear relationship between the number of antennas and complexity, which impacts power consumption, among other performance targets. Some wireless devices may use switching circuitry to couple its single transceiver (e.g., single-radio) to multiple antennas, one at a time, which can result in reduced BOM, footprint, complexity, and overall power consumption (e.g., compared to multi-radio solutions). These systems may have the complexity associated with one antenna, plus a small overhead for the switching control. In single-radio solutions, the RF signals are received through antennas at different times so determining the relevant phase differences (e.g. for AoA estimation) may rely on fixed frequency RF signals, such as the constant tone extension (CTE) of Bluetooth signals, to provide reasonably accurate AoA estimations. In one embodiment, wireless device 118 may be a single radio solution wherein Ant. 1, 2, 3, . . . N may be sampled at different times using a switching circuitry, such as switch component 112. Referring to Diagram 4 356, φ1 represents the phase value of the incoming RF signal, such as RF incoming pattern 302, observed on Ant. 1 308 at t1. In one embodiment, φ2 represents the phase value of the incoming RF signal observed on Ant. 2 306 at t2. Since there is a time lapse (t2−t1) between the two observations, the phase difference of observed signals on Ant. 1 308 and Ant. 2 306 at t1 may be generated as follow:

$$\varphi 2,t1-\varphi 1,t1=\varphi 2,t2-\varphi 1,t1-\Delta\varphi 2,(t2-t1) \qquad \text{Equation (4)}$$

where Δφ2,(t2−t1) is the phase change of the RF signal on Ant. 2 306 between t2 and t1. When frequency (f) of the incoming RF signal is constant and known, the phase change may be generated as follows:

$$\Delta\varphi 2,(t2-t1)=2\pi f\times(t2-t1) \qquad \text{Equation (5)}$$

In one embodiment, phase differences between two of the multiple antennas, such as Ant. 1 308, Ant. 2 306, and Ant. 3 may be generated for AoA estimation of RF incoming pattern 302, using Equations 4 and 5. It will be the understanding that the embodiment discussed above is one of the methods for AoA estimation in a single-radio solution merely for explanation purposes. One having ordinary skill in the art may generate AoA estimation in single-radio solutions with other algorithms and methods.

As previously discussed, wireless devices 118, 102 of FIG. 1 and 202, 212 of FIG. 2 may be Bluetooth devices. In one embodiment, Bluetooth Low Energy (BLE) devices may utilize Constant Tone Extension (CTE) for directional estimation purposes. CTE is a signal with fixed frequency attached to Bluetooth packets transmitted via RF signals, such as RF incoming pattern 302, that has a variable length. In one embodiment, if a device supports 1-μs-long switch and sample slots, it may support them on all supported PHYs that allow CTEs. CTE can be one of two types: AoA or AoD. In embodiments, CTE may be an limited resource.

Figure 4:
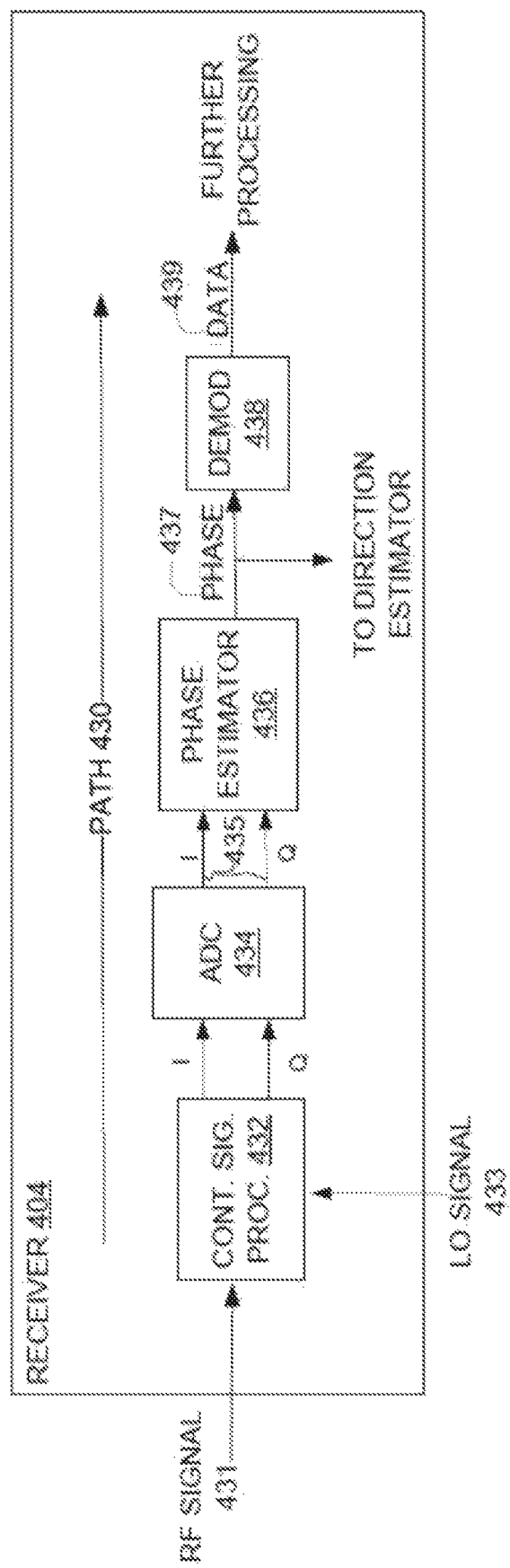
FIG. 4 is a schematic diagram illustrating a receiver in accordance with one embodiment of the subject matter.

FIG. 4 is a block diagram illustrating a receiver 404, in accordance with an embodiment. The receiver 404 of FIG. 4 is an example of the analog and digital signal processing used to provide the demodulation function for a wireless device, such as RF receiver 114 of wireless device 118 in FIG. 1. The receiver 404 is shown to include continuous-time signal processing 432, analog to digital converter (ADC) 434, phase estimator 436, and demodulator 438 all along a receive path 430. In one embodiment, RF signal 431, such as RF signals observed on Ant. 1, 2, or 3 in FIGS. 3A and 3B, enters the continuous-time signal processing 432 where it is filtered and mixed with the local oscillator signal 433 to down-convert the desired frequency (e.g., or channel) to an intermediate frequency. In one embodiment, the down-conversion process provides the intermediate frequency as complex I and Q signals which are sampled and digitized by the ADC 434. The phase estimator 436 may perform calculations to estimate the phase 437 of the RF signal 431 for the time it was received at the antenna using the I and Q values 435, and forward the phase value to the demodulator 438, which forwards the data 439 (e.g., the decoded sequence of 1s and 0s) for further processing (e.g., packet processing). The phase estimator 436 also forwards the phase 437 to the direction estimator 522 of FIG. 5 (e.g., or to a memory) for use in AoA estimation, as described herein. It will be the understanding that the embodiment illustrated in FIG. 4 is one example of RF receiver for explanation purposes, and should not be construed as a limitation.

Figure 5:
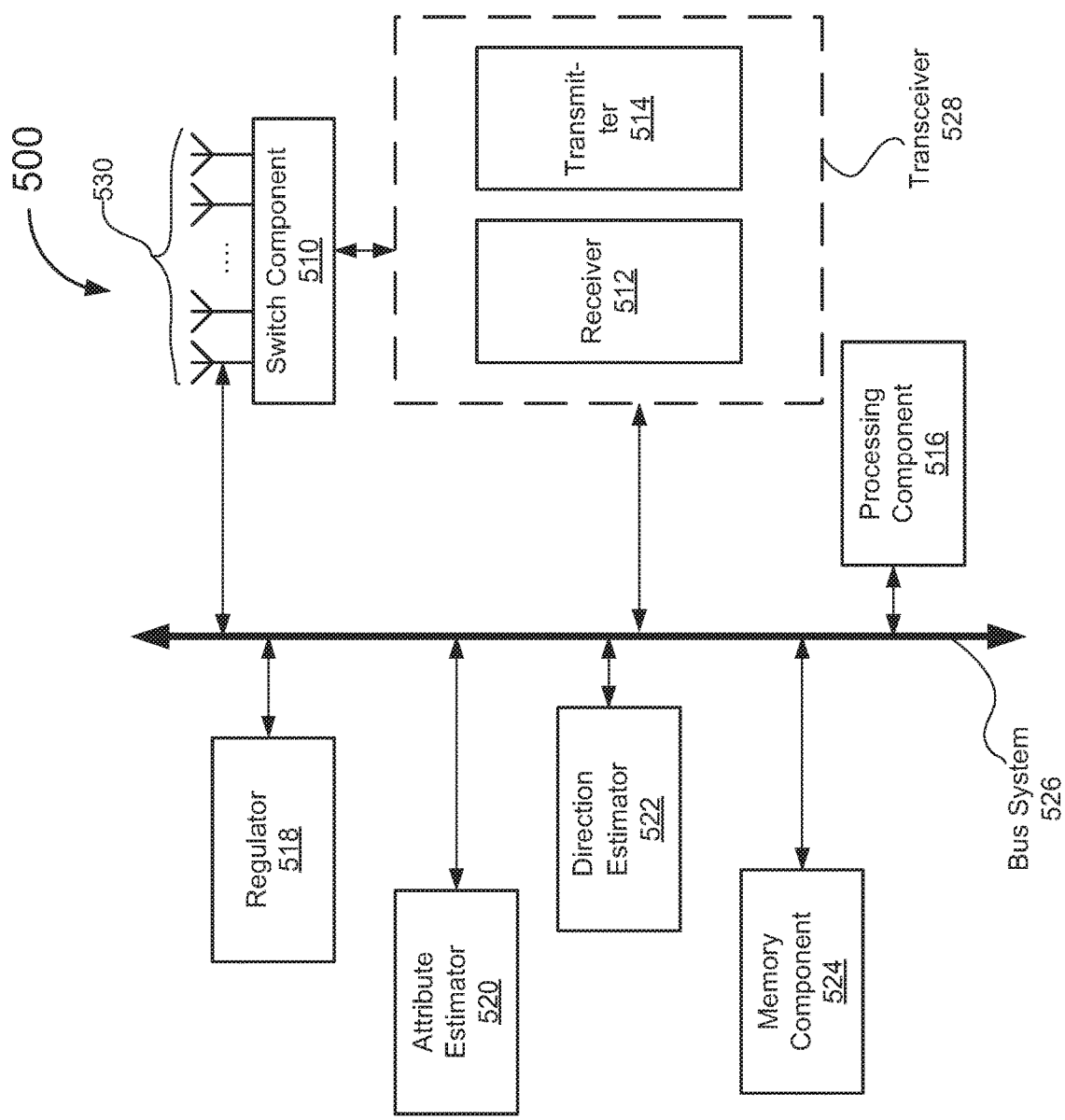
FIG. 5 is a schematic diagram illustrating a wireless device in accordance with one embodiment of the subject matter.

FIG. 5 is a block diagram illustrating a wireless device 500 to estimate AoA based on an RF signal, in accordance with embodiments. In an embodiment, the wireless device 500 may be the wireless device 118 of FIG. 1. The various function blocks in FIG. 5 are shown to be coupled to one another through a bus system 526. The bus system 526 including the connections (e.g., the arrows) between the various blocks may represent one or more media for propagation of analog signals, digital data, control signals, power supply, and/or or any other communication. The bus system 526 may include any appropriate bus configuration without departing from the claimed subject matter.

The direction estimator 522 is to estimate AoA, AoD, or the direction of a source (e.g., transmitting antenna 104 in FIG. 1) of an RF signal relative to multiple receive antennas (e.g., three or more) using one or more attributes of the RF signal. The direction estimator 522 may estimate direction based, at least in part, on phase differentiation as in Equation (3), discussed above with respect to FIG. 3A. Accuracy of the AoA estimation may depend on various factors including, without limitation, magnitude differentiation, polarity of RF signals, the number of antennas (e.g., diversity in space), distance between antennas, the duration of RF signals received on each antenna (e.g., number of samples), direct RF path availability, and signal quality. In embodiments, the samples of the RF signal all correspond to one or more communication protocol packets (e.g., successive packets) and the direction estimator 522 can estimate AoA without establishing a modulation (e.g., Gaussian Frequency-Shift Keying (GFSK)) connection with the source device. In embodiments, the direction estimator 522 may provide or initiate raw data processing to perform noise filtration, data averaging over time, and/or antenna model correlation for the estimation of the final result.

The receiver 512 is to receive RF signals through one or more antennas in antenna cluster or array 530. In one embodiment, receiver 512 may be coupled through switching circuitry (e.g., switch component 510), to any antenna in antenna array 530. In an embodiment, receiver 512 along with transmitter 514 may be part of transceiver 528. In one embodiment, switch component 510 may be a multi-pole switch controlled by processing component 516 by an input signal. Switch component 510 may be any appropriate coupling circuitry or multiplexing components (e.g. circuits, wires, traces, pins, etc.) known in the art whose switching and/or selection function may be controlled by any block (e.g., within or external to wireless device 500) coupled to its input. In some embodiments, in addition to estimating phase values of RF signals for AoA estimations, receiver 512 may provide analog and digital signal processing to provide demodulation of RF signals for the wireless device 500.

Attribute estimator 520 is to estimate attributes of RF signals. Attributes of RF signals may include, without limitation, signal frequency, angular frequency, amplitude, phase, wavelength, wave speed, time of arrival, time difference of arrival, phase difference, phase difference of arrival, signal strength, and/or any other RF signal attributes or derivatives thereof. The attribute estimator 520 is to provide estimated attributes to the direction estimator 522 for use in estimating AoA. In some embodiments, attribute estimator 520 receives attribute information representing or related to RF signal attributes from receiver 512 and attribute estimator 520 may estimate RF signal attributes using the attribute information. The attribute estimator 520 may include analog and/or digital logic and/or measurement configurations to obtain RF attributes based on measurements or samples made at one or more locations along the receive path of an RF signal. Although shown as being separate, attribute estimator 520 may be implemented in whole or in part within the direction estimator 522 or receiver 512. In one embodiment, receiver 512 may include its own attribute estimator.

Regulator 518 is to regulate and/or compensate for conditions of the receiver 512 so that attributes of the received RF signals can be relied upon for use in AoA estimations. For example, regulator 518 may determine and/or regulate frequency, phase, or other characteristics of input to or output from receiver 512 to control the effect on RF signal attributes used for AoA estimation.

In embodiments, processing component 516 is to execute at least a portion of one or more of direction estimator 522, attribute estimator 520, regulator 518, or any other function block of wireless device 500, using corresponding firmware stored in the memory component 524. Alternatively or additionally, any of the function blocks of the wireless device 500 shown in FIG. 5 may include its own processing circuitry (not shown) and/or memory. For example, direction estimator 522, attribute estimator 520, regulator 518, or any other function block of wireless device 500 may include hardware (circuitry, dedicated logic, etc.), software (such as is run on a general purpose computing system or a dedicated machine), firmware (embedded software), or any combination thereof to perform its functionality.

In an embodiment, processing component 516, memory component 524, receiver 512, and switch component 510 are part of a System on Chip (SoC) and may reside on a common carrier substrate or be implemented in different combinations of separate integrated circuits. The example SoC may be configured to implement attribute estimator 520, direction estimator 522, and/or the regulator 518, in accordance with embodiments.

Figure 6A:
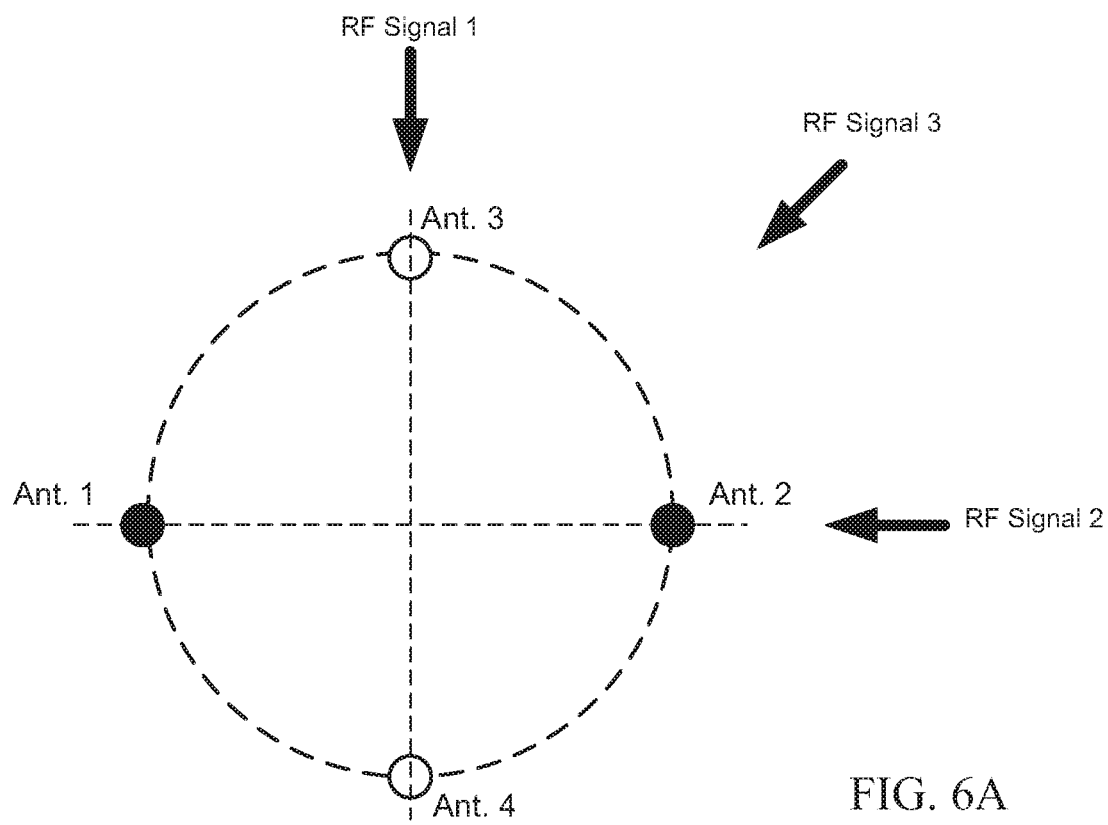
FIGS. 6A and 6B are schematic diagrams illustrating antenna arrays using RF wave propagation model for determining AoA estimation in accordance with one embodiment of the subject matter.
Figure 6B:
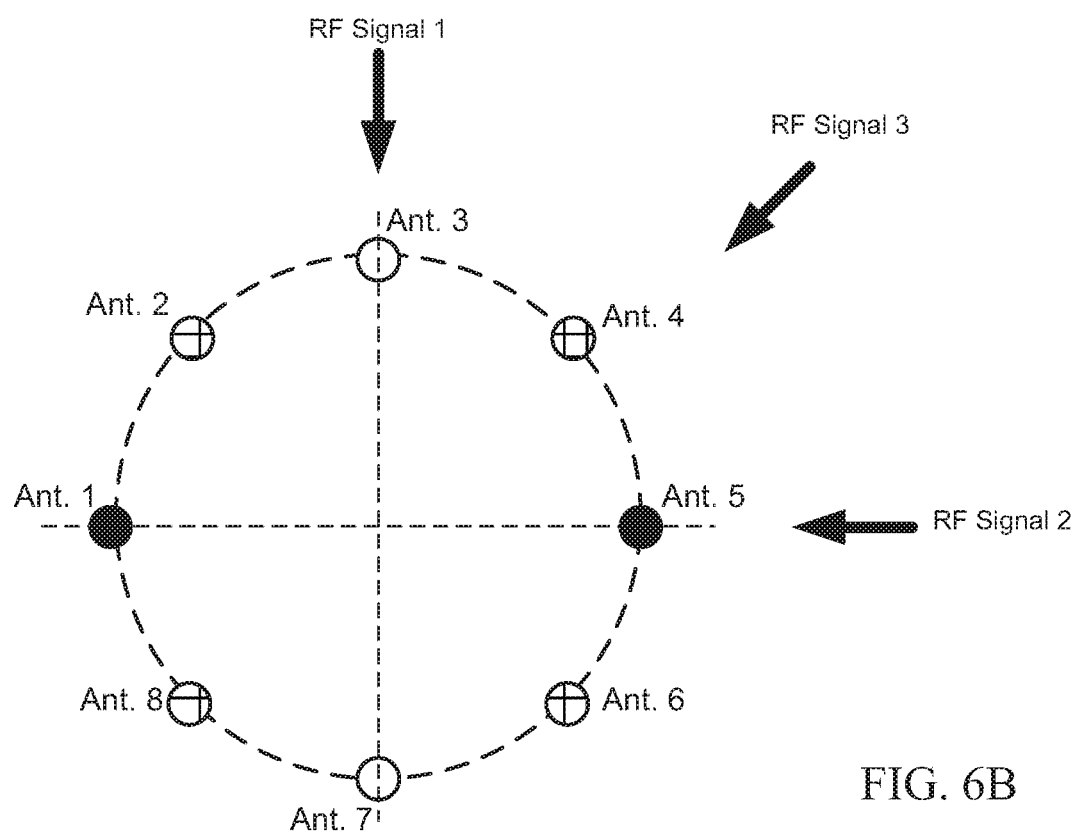
Figure 7:
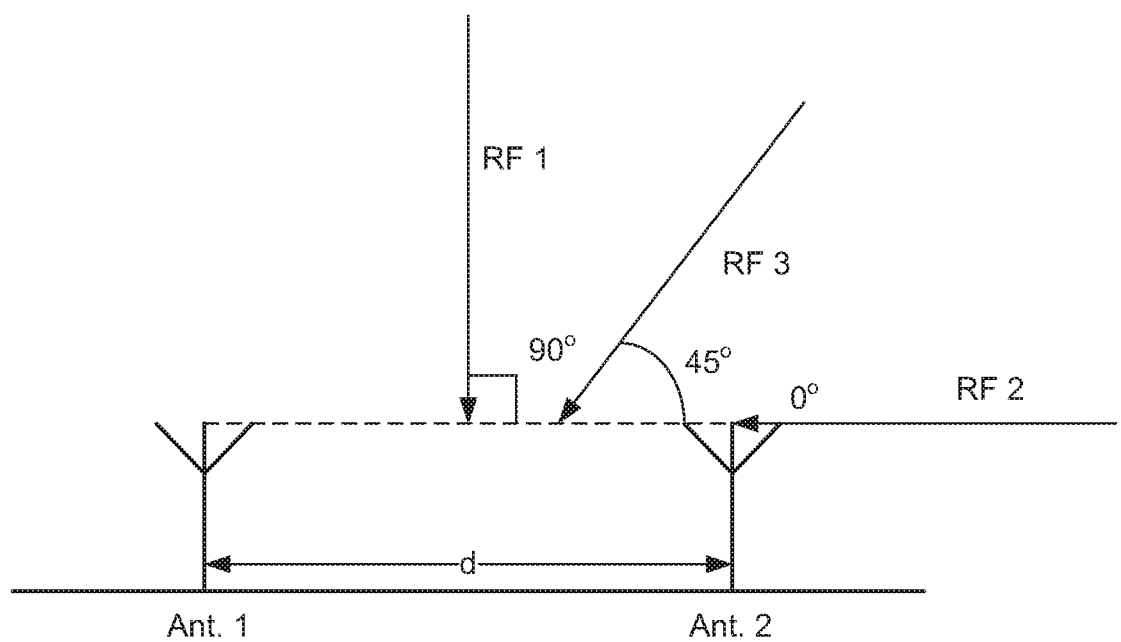
FIG. 7 is a schematic diagram illustrating a RF wave propagation model for determining AoA estimation in accordance with one embodiment of the subject matter.

FIGS. 6A and 6B are schematic diagrams illustrating two examples of an antenna array according embodiments of the present disclosure. FIG. 7 is a schematic diagram illustrating two antennas of an antenna array. As previously discussed, differences in measurements, including phase differentiation and magnitude differentiation between two antennas may contribute to directional estimation, such as AoA, AoD, or a source of RF signals. In one embodiment, magnitude differentiation may be more useful in antenna arrays having directional antennas. In some embodiments, certain complex antenna clusters with omni-directional antennas may be useful in directional estimation with the introduction of magnitude directional discrimination due to the coupling and interference of RF signals (waves). In one embodiment, regardless of antenna array geometry and algorithms in generating directional estimation, phase differentiation and magnitude differentiation signal-to-noise ratio (SNR) may define the upper limit of AoA or AoD resolution.

Figure 8:
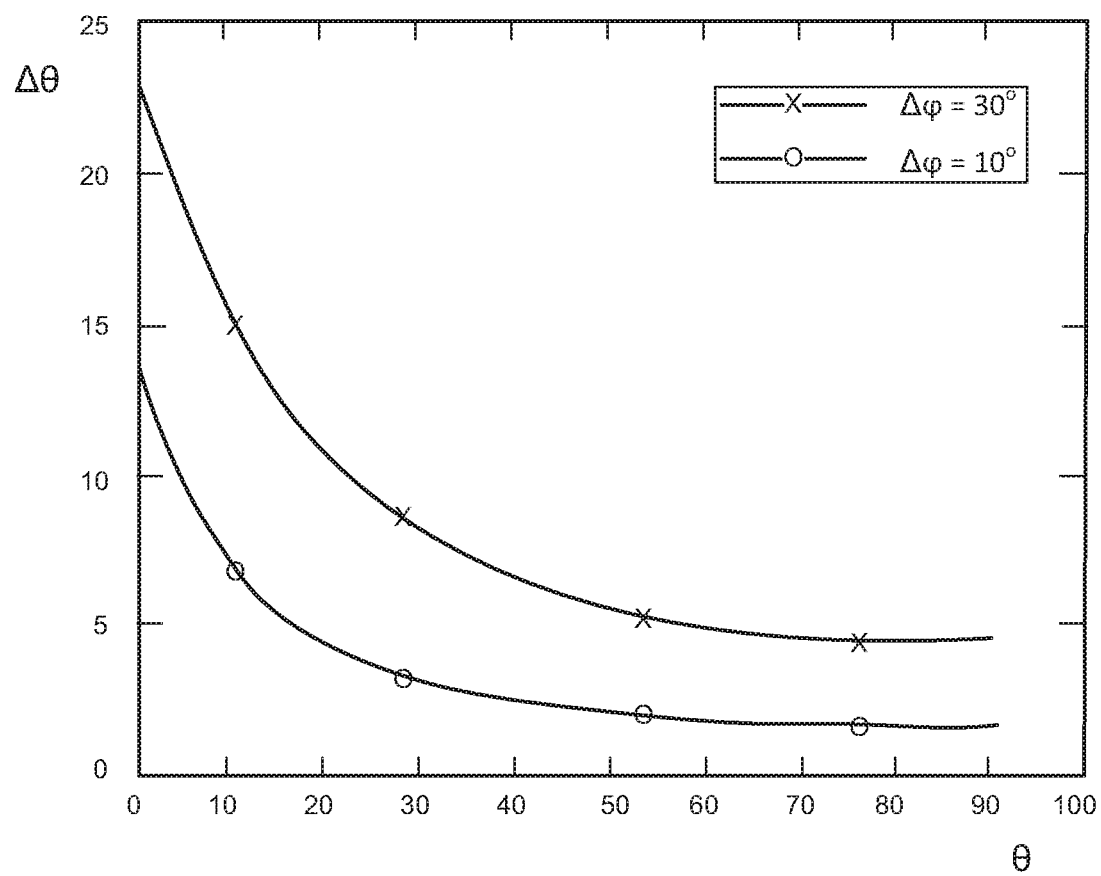
FIG. 8 is a graph diagram illustrating effects of RF propagation angles on sensitivity in accordance with one embodiment of the subject matter.

Referring to FIG. 7, Ant. 1 and Ant. 2 are two receiving antennas having a distance D from one another. In one embodiment, Ants. 1 and 2 may be omni-directional antennas, phase measurement error distribution may be crucial to the overall directional estimation error distribution. As shown, in FIG. 7, RF1, RF2, and RF3 are three RF signals propagating towards a plane connecting Ants. 1 and 2 at approximately 90°, 0°, and 45° (θ=propagation directional angle or AoA), respectively. To differentiate propagation directional angle change, wireless devices may statistically differentiate the corresponding phase difference change, as follows:

$$\theta2=\theta1+\Delta\theta$$

where $\Delta\theta$ is the directional angle change. And correspondingly, $$d\varphi2=d\varphi1+\Delta\varphi$$

where $\Delta\varphi$ is the phase difference change between pairs of antenna, such as Ant. 1 and Ant. 2. The relationship between $\Delta\theta$ and $\Delta\varphi$ may be defined as follows:

$$d\varphi=2\pi D\times\cos(\theta)/\lambda$$

$$d\varphi2-d\varphi1=2\pi D\times(\cos(\theta2)-\cos(\theta1))/\lambda$$

$$\Delta\varphi=2\pi D\times(\cos(\theta2)-\cos(\theta1))/\lambda \qquad \text{Equation (5)}$$

wherein the phase difference change (Δφ) may indicate the RF sensitivity in directional estimation of antenna pairs. Referring to FIG. 8, a graph demonstrating the relationship between RF sensitivity, directional angle (θ), and θ change (Δθ) is shown. As illustrated, Δθ is plotted against θ at two RF sensitivity level (Δφ=30° and Δφ=10°). In both sensitivity levels, the results show that when θ decreases from 90° to 0°, RF sensitivity decreases as it will take a larger directional angle change (Δθ) to effect the same change in phase difference (30° or 10°). For examples, at Δφ=30°, and both D and λ is 125 mm, the results show:

Δθ=4.78° when θ≈90°;
Δθ=5.69° when θ≈60°; and
Δθ=23.56° when θ≈0°.

Since Ants. 1 and 2 may be omni-directional, the results may indicate that antenna pairs that have a connecting plane that is perpendicular (θ=90°/270°) to the propagation direction of RF signals may have the highest RF sensitivity, whereas the connecting plane that is parallel (θ=0°/180°) the lowest. Referring to FIG. 7, accordingly, antenna pair featuring Ants. 1 and 2 may be the most sensitive to RF1, followed by RF3 and the worst to RF2. In one embodiment, the performance of linear arrays in directional estimation of AoA and AoD may degrade as high as five times when the incoming RF signals are parallel to the plane connecting the antennas. It illustrates that antenna orientation to incoming RF signals is one of the contribution factors that may impact directional estimation resolution and accuracy.

FIG. 6A shows a circular antenna array having 4 antennas (Ants. 1, 2, 3, and 4) equally spaced around its perimeter. According to the previous discussion in FIGS. 7 and 8, from an antenna orientation perspective, the pair featuring Ants. 1 and 2 may be the most sensitive, and hence the most efficient pair for directional estimation of RF signal 1 (θ≈90°). Similarly, Ants. 3 and 4 may form the most efficient pair for RF signal 2. In one embodiment, neither Ants. 1 and 2 nor Ants. 3 and 4 may form an efficient antenna pair for RF signal 3, which is incoming at around 45°. In one embodiment, Ants. 2 and 3, from a pure antenna orientation perspective, may form an efficient pair for RF signal 3. However, Ants. 2 and 3 may have a shorter distance between them, and the short distance may adversely affect its efficiency and sensitivity in directional estimation. Therefore, it indicates that antenna pair orientation is only one of the contribution factors in deciding efficient or most contributing antennas in directional estimation.

FIG. 6B shows a circular antenna array having 8 antennas (Ants. 1-8) equally spaced around its perimeter. Similar to the four-antenna array in FIG. 6A, the eight-antenna array may have the most efficient pairs for both RF signals 1 (Ants. 1 and 5) and 2 (Ants. 3 and 7). Additionally, Ants. 2 and 6 may form an efficient pair for RF signal 3 that comes in at around 45°. In one embodiment, the eight-antenna array may improve up to 1.3 times in directional estimation resolution compared to the worst case in the four-antenna array. It indicates that the number of antennas in an array may also be one of the contribution factors in deciding efficient antennas in directional estimation. While directional resolution may be improved by having more active antennas in an array and increased physical distance among the antennas, in some applications, they may not be feasible due to restraint in power consumption, BOM and footprint. In addition, not all antennas in an array may contribute equally in response to RF signals coming in at different angles. Using the four-antenna array in FIG. 6A as an example, for RF signal 1, the pair featuring Ants. 3 and 4 are the least sensitive pair for directional estimation and may contribute the least in improving directional resolution. In some embodiments, Ants. 3 and 4 even generate directional estimation data that may adversely affect directional resolution of the four-antenna array. Therefore, it may conserve power, reduce latency and conserve resources by deselecting or not sampling one or more antenna for directional estimation purposes of RF signals propagating with certain incoming angles. Similarly, not all eight antennas in the eight-antenna array may be contributing efficiently or critical in resolution improvement for directional estimation. For example, Ants. 3 and 7 may be deselected for directional estimation of RF 1 while Ants 4 and 8 may be deselected for directional estimation of RF 3.

Figure 9:
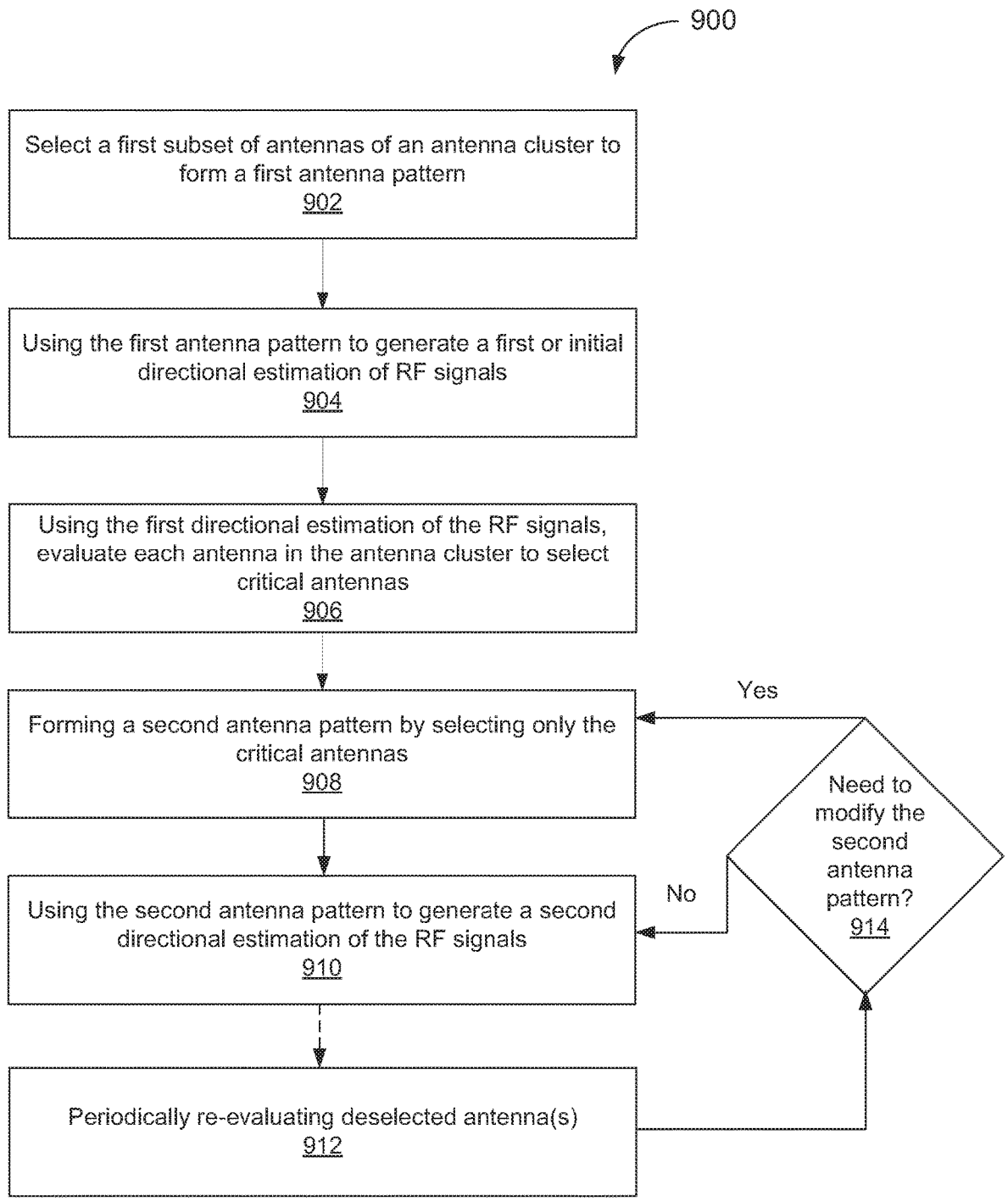
FIG. 9 is a flowchart illustrating a method of estimating AoA in accordance with one embodiment of the subject matter.
Figure 10A:
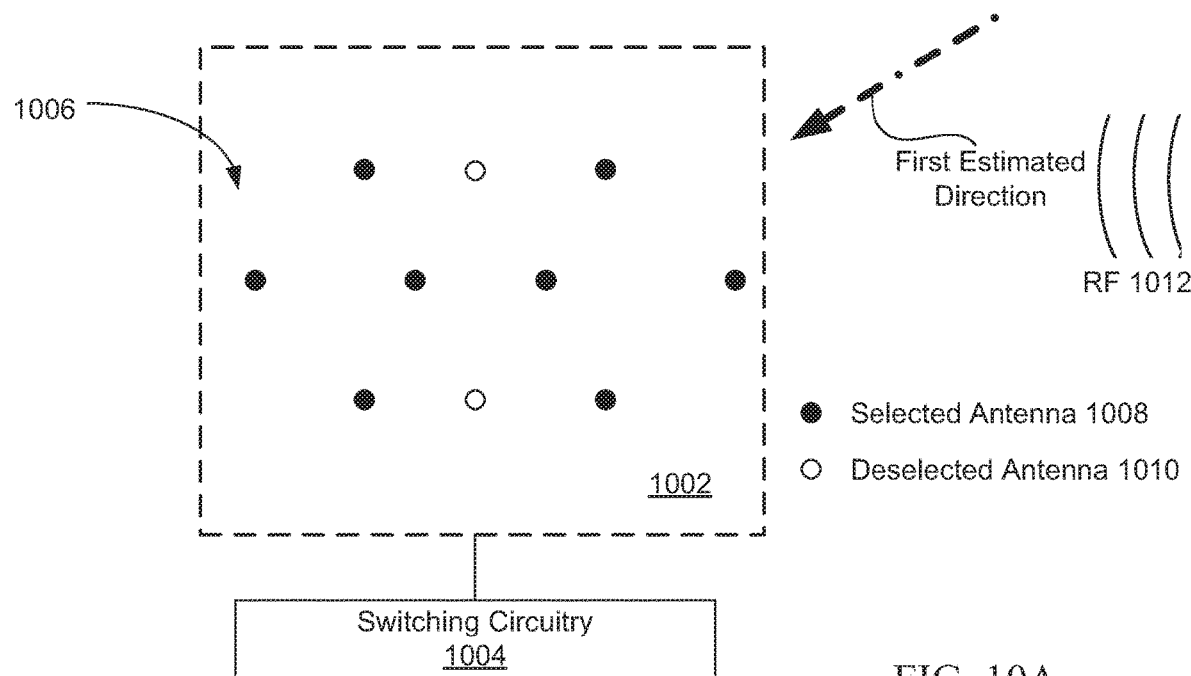
FIGS. 10A, 10B, 10C are schematic diagrams illustrating dynamic switching of an antenna array in accordance with one embodiment of the subject matter.
Figure 10B:
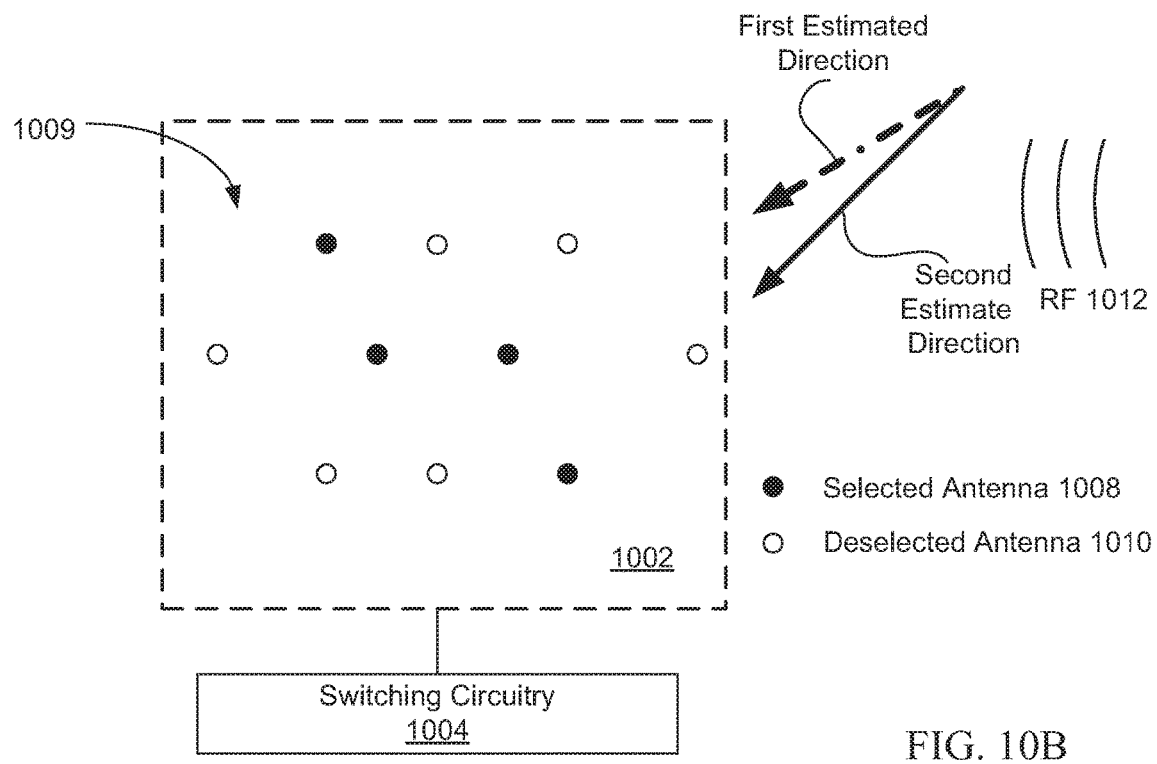

FIG. 9 is a flowchart illustrating a method of directional estimation 900 in accordance with one embodiment of the subject matter. FIG. 10A is a schematic diagram showing an embodiment of an initial or a first directional estimation, and FIG. 10B is a schematic diagram showing an embodiment of a second directional estimation, both according to the present disclosure. In one embodiment, the method 900 starts when a wireless device is receiving RF signals from a peer wireless device. Using the embodiment illustrated in FIG. 1 as an example, wireless device 102 transmits RF signals 108 and the signals are received by wireless device 118. As previously discussed, in one embodiment, RF signals 108 may be Bluetooth or BLE signals wherein constant tone extension (CTE) may be attached for directional finding purposes. Duration of CTE is controlled and limited by Bluetooth protocol. While CTE duration may be extendable by multiplying transmitted AoA packets, the longer or multiplied duration(s) of CTE may exhaust power supply on both the transmitting device, such as wireless device 102 and receiving device, such as wireless device 118 of FIG. 1. Since CTE is a limited resource, it may improve power conservation and resolution in directional estimation by deselecting antenna(s) that is the least contributing. In other embodiments, RF signals 108 may be RF signals of other networks (such as Wi-Fi) having a constant frequency component attached for directional finding purposes.

Referring to FIG. 9 and FIG. 10A, antenna array 1002 may be antenna array 110 of wireless device 118 of FIG. 1 or antenna array 530 of wireless device 500 of FIG. 5. In one embodiment, antenna array 1002 includes ten antennas. It will be the understanding that the quantity and spatial arrangement of antennas in antenna array 1002 illustrated in FIG. 10A is only for illustrative purposes, and should not be construed as limitations. In embodiments, one having ordinary skill in the art would decide those configurations according to system design and requirements. Antenna array 1002 may be coupled to switching circuitry 1004, which may be similar to switch component 112 in FIG. 1 or switch component 510 in FIG. 5. Switching circuitry 1004 may couple one antenna to a single receiver or receiver component at a time (e.g., switch component 510 may rotate between multiple antennas and couple one antenna to receiver 512 at a time). In another embodiment, switching circuitry 1004 may couple multiple antennas to a single receiver or receiver component at a time. In a further example, switching circuitry may couple one antenna to a first receiver or receiver component, and may couple multiple antennas to a second receiver or receiver component. Switching circuitry 1004 may be any appropriate coupling or multiplexing circuitry known in the art in which switching, multiplexing, and/or selection function may be controlled by any block coupled to its input. As best illustrated in FIGS. 9 and 10A, in step 902, switching circuitry 1004 selects a first subset of antennas for initial directional estimation. In one embodiment, eight selected antennas 1008 may form a first or initial antenna pattern (or subset) 1006. Deselected antenna(s) 1010 may be switched off or not sampled for directional estimation purposes. It will be the understanding that initial antenna pattern 1006 is for illustrative purposes only, and is not intended to be a limitation. Subsequently, in step 904, initial antenna pattern 1006 may be used to generate directional estimation of incoming RF signals 1012. In embodiments, selected antennas 1008 of initial antenna pattern 1006 may form antenna pairs for directional (AoA or AoD) estimation of incoming RF signals 1012, according to embodiments disclosed in FIGS. 3A, 3B, 4, and 5 or other algorithms known in the art. A first or initial estimated direction may be generated, at the conclusion of step 904.

In some alternative embodiments, the initial estimated direction may not be generated by antenna array 1002 and the receiver. The initial estimated direction instead may be generated or provided at least in part by Global Navigation Satellite (GPS) systems, Wi-Fi-based positioning system (WPS), RFID, Time of Arrival (ToA), or non-radio systems, such as magnetic positioning, inertial measurements, positioning based on visual markers, location based on known visual features, etc.

Using the initial estimated direction, in step 906, each antenna in antenna array 1002 may be evaluated according to their contribution or effectiveness in improving directional resolution for the initial estimated direction. In alternative embodiments, only previously deselected 1010 or selected 1008 antennas may be evaluated. Or only some of the antennas in antenna array 1002 are evaluated. As previously explained, contribution factors may include but not be limited to antenna (pair) orientation as explained in FIGS. 6A to 8, polarity of RF signals, magnitude differentiation, received signal strength indicator (RSSI), the number of antennas (e.g., diversity in space), distance between antennas, the duration of RF signals received on each antenna (e.g., number of samples), SNR, and signal quality, etc. In one embodiment, an antenna contribution analyzer in the wireless device may take contribution factors of antennas in antenna array 1002 into consideration to generate an antenna contribution matrix for antenna selection. In one embodiment, antenna contribution analyzer may be a part of the processor, such as processing component 516 of wireless device 500.

Subsequently, in step 908, one or more previously selected antenna 1008 in initial antenna pattern 1006 may be deselected due to its low contribution factor and considered noncritical in directional estimation of RF signals having the initial estimated direction. In one embodiment, switching circuitry 1004 may then only switch to observe or sample selected antenna 1008, and as a result form second antenna pattern (or subset) 1009, as best shown in FIG. 10B. The potential reduction in number of selected antennas in second antenna pattern 1009 may help the receiving wireless device, such as wireless device 118, to conserve power and reduce latency. In one embodiment, selected antennas 1008 in second antenna pattern 1009 may have longer observation time to improve directional resolution and precision. Additionally or alternatively, the overall time for directional estimation may be reduced due to the improved resolution. Consequently, it may help conserve the CTE resource or other directional finding attachments as it is only provided to the most contributing antennas. In embodiments, receiving device, such as wireless device 118, may notify transmitting device, such as wireless device 102, to reduce the CTE duration in transmitted packets. In embodiments, the number of antennas in second antenna pattern 1009 may not be reduced from first antenna pattern 1006, instead only antennas having high contribution factor are selected for directional resolution and precision improvement purposes. In some embodiment, previously deselected antenna(s) 1010 in the first antenna pattern 1006 may be selected for the second antenna pattern 1009 due to its high contribution factors in potentially generating the initial estimated direction.

Subsequently, in step 910, the receiving device may generate a second estimated direction of incoming RF signals using the second antenna pattern 1009. In one embodiment, the second estimated direction may be considered an improvement in directional estimation precision because only the most contributing antennas are selected. Additionally or alternatively, it may save power, CTE resource, and reduce latency because the overall operation time may be reduced.

Subsequently or optionally, in step 912, the receiving device may periodically re-evaluate deselected antennas 1010 based on their contribution factors in second antenna pattern 1009. The reevaluation process may be similar to 906, wherein each deselected antenna 1010 may be evaluated whether it should remain deselected. In one alternative embodiment, one or more currently selected antenna 1008 in second antenna pattern 1009 may also be reevaluated as whether it should remain selected.

Subsequently, in step 914, based on the result of step 912, selection status of certain antenna(s) may have changed. If modification of second antenna pattern 1009 is needed, the process may go back to step 908. In that, switching circuitry 1004 may switch on one or more previously deselected antenna 1010, or switch off one or more previously selected antenna 1008. Then, the receiving device may use the modified second antenna pattern to continue to generate AoA estimation of incoming RF signals. If status of antennas is unchanged, there is no need to modify second antenna pattern 1009, and the receiving device may continue to use second antenna pattern 1009 for directional estimation. In one embodiment, the receiving device may dynamically change or modify its antenna pattern such that only the most contributing antennas may be selected responding to constantly changing environmental factors and RF signal 1012 attributes.

The method of directional estimation 900 may be modified for AoD estimation. In one embodiment, antenna array 1002 may be disposed in transmitting device, such as wireless device 202 of FIG. 2. Switching circuitry 1004 may be similar to switch component 206. The receiving device, such as wireless device 212 may be responsible for generating the antenna contribution matrix for antenna selection. Wireless device 212 may transmit instructions to wireless device 202 for forming and dynamically changing, using at least switch component 206, the antenna pattern of antenna array 204.

Figure 10C:
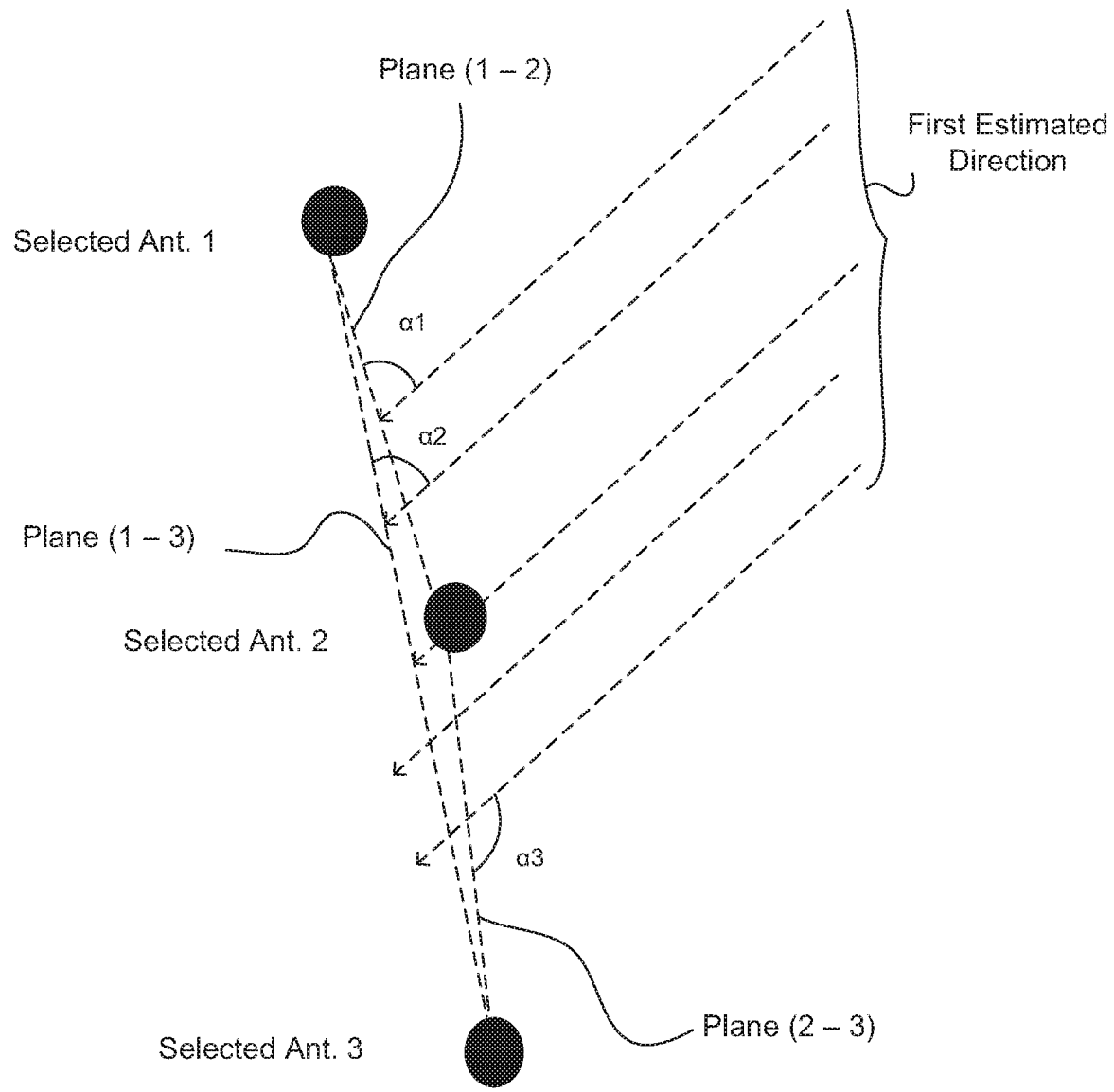

FIG. 10C is a representative schematic illustrating selected antennas in second antenna pattern according to one embodiment of the present disclosure. As discussed, antenna orientation may be one of the contribution factors in selecting an antenna in an antenna pattern for directional estimation. As shown in FIG. 10C, selected Ant. 1, 2, and 3 may form three antenna pairs that have an angle (AoA) α1, α2, α3 against the first estimated direction. From a pure antenna orientation perspective, Ant. 1-3 may have strong contribution when α1-α3 are within a threshold angle to 90° or 270°.

Figure 11:
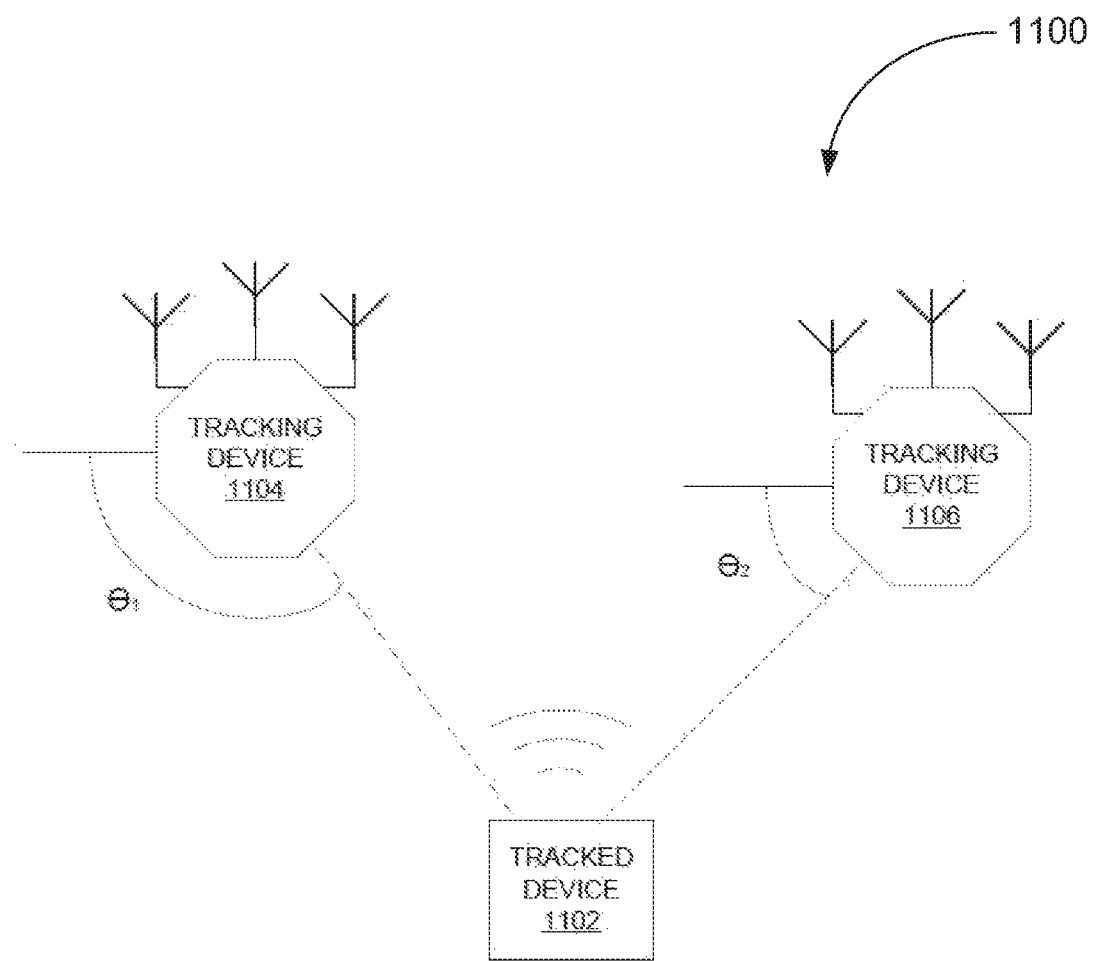
FIG. 11 is a schematic diagram illustrating one application of the dynamic antenna array switching embodiments in accordance with one embodiment of the subject matter.

FIG. 11 is a block diagram illustrating an AoA estimation configuration 1100 applicable to various applications, in accordance with embodiments. In embodiments, the tracked device 1102 includes at least one antenna (not shown) to transmit RF signals and the tracking devices 1104 and 1106 each include at least three antennas or an antenna cluster and use the systems and methods described herein to estimate an AoA of the tracked device 1102. In alternative embodiments, tracked device 1102 may include multiple antennas or an antenna array (not shown) to transmit RF signals and tracking devices 1104 and 1106 may use the systems and methods described herein to estimate an AoD of the tracked device. AoA or AoD estimations from the multiple tracking devices 1104 and 1106 and/or other information such as distance ranging or topology knowledge can be used (e.g., by any network node) to estimate two or three-dimensional location of the tracked device 1102. This capability may be used for, without limitation, warehouse/retail inventory tracking indoor location/navigational services, network efficiency, home automation devices with location assistance, asset tracking, and key-less entry for automotive.

Embodiments of the subject matter include various operations described herein. These operations may be performed by hardware components, software, firmware, or a combination thereof.

Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

In the foregoing specification, the subject matter has been described with reference to specific exemplary embodiments thereof. It will, however, be evident that various modifications and changes may be made thereto without departing from the broader spirit and scope of the subject matter as set forth in the appended claims. The specification and drawings are, accordingly, to be regarded in an illustrative sense rather than a restrictive sense.

What is claimed is:

1. A method, comprising:
   selecting, using a switching circuitry, a first subset of antennas from an antenna cluster, to form a first pattern;
   receiving, using the first subset of antennas, a first Bluetooth signal;
   generating a first directional value of the first Bluetooth signal;
   evaluating, using a processing element, at least one antenna of the antenna cluster based at least partly on the first directional value of the first Bluetooth signal;
   selecting, using the switching circuitry, a second subset of antennas from the antenna cluster based on results of the evaluating the at least one antenna, to form a second pattern, wherein the second pattern is different from the first pattern;
   receiving, using the second subset of antennas, a second Bluetooth signal;
   generating a second directional value of the second Bluetooth signal;
   evaluating, using the processing element, at least one antenna that is not included in the second pattern based at least partly on the second directional value of the second Bluetooth signal; and
   adding at least one antenna based on results of the evaluating the at least one antenna that is not included in the second pattern, to the second subset of antennas to form a third subset of antennas.

2. The method of claim 1, further comprising:
   receiving, using the third subset of antennas, a third Bluetooth signal; and
   generating a third directional value of the third Bluetooth signal.

3. The method of claim 1, wherein the first and second Bluetooth signals are Bluetooth Low Energy (BLE) signals including Constant Tone Extension (CTE).

4. The method of claim 3, further comprising:
   notifying a wireless device transmitting the first Bluetooth signal to shorten a duration of CTE in the second Bluetooth signal.

5. The method of claim 1, wherein antenna pairs in the first subset of antennas that have an orientation within a predetermined threshold value to 90° or 270° against a propagation direction of the first Bluetooth signal are selected to form the second subset of antennas.

6. The method of claim 1, wherein the first and second directional values include an angle of arrival (AoA) associated with the first and second Bluetooth signals, respectively.

7. The method of claim 1, the second pattern includes fewer antennas than the first pattern.

8. The method of claim 1, wherein the evaluating the at least one antenna of the antenna cluster comprises:
   generating and comparing one or more contribution factor of each antenna in the first pattern, wherein contribution factors include at least one of: orientation of antenna pairs in the first pattern against the first directional value, polarity, Received Signal Strength Indicator (RSSI), and Signal-to-Noise Ratio (SNR), of the first Bluetooth signal.

9. The method of claim 1, wherein the selecting the second subset of antennas comprises:
   deselecting at least one antenna from the first subset of antennas to form the second subset of antennas.

10. An apparatus, comprising:
    a transceiver;
    a switching circuitry configured to couple to an antenna cluster, wherein the switching circuitry is further configured to couple at least one antenna of the antenna cluster to the transceiver; and a processing element configured to;
cause the switching circuitry to couple a first subset of antennas of the antenna cluster to the transceiver to receive a first Bluetooth signal;
generate a first angle of arrival (AoA) estimation of the first Bluetooth signal;
cause the switching circuitry to couple a second subset of antennas of the antenna cluster, based at least partly on the first AoA estimation, to the transceiver to receive a second Bluetooth signal, wherein the first and second subsets of antennas are different from one another;
generate a second AoA estimation of the second Bluetooth signal; and
cause the switching circuit to add at least one antenna that is not in the second antenna subset based at least partly on the second AoA estimation, to form a third subset of antennas.

11. The apparatus of claim 10, wherein the processing element is further configured to:
cause the switching circuitry to couple the third subset of antennas to the transceiver to receive a third Bluetooth signal; and
generate a third AoA estimation of the third Bluetooth signal.

12. The apparatus of claim 10, wherein the processing element is further configured to evaluate each antenna in the first subset based on its one or more contribution factor in generating the first AoA estimation.

13. The apparatus of claim 12, wherein contribution factors include at least one of: orientation of antenna pairs in the first subset against a propagation direction of the first Bluetooth signal based on the first AoA estimation, polarity, Received Signal Strength Indicator (RSSI), and Signal-to-Noise Ratio (SNR), of the first Bluetooth signal.

14. The apparatus of claim 11, wherein the processing element is further configured to evaluate at least one antenna that is not in the second subset based on its one or more contribution factor in generating the second AoA estimation, wherein contribution factors includes at least one of: orientation of antenna pairs that is not in the second subset against propagation direction of the second Bluetooth signal, polarity, Received Signal Strength Indicator (RSSI), and Signal-to-Noise Ratio (SNR), of the second Bluetooth signal.

15. The apparatus of claim 10, wherein the first and second Bluetooth signals are Bluetooth Low Energy (BLE) signals including Constant Time Extension (CTE).

16. The apparatus of claim 10, wherein the second subset includes fewer antennas than the first subset.

17. A wireless device, comprising:
an antenna cluster including at least three antennas;
a transceiver;
a switching circuit configured to couple at least two antennas of the antenna cluster to the transceiver to form an antenna subset; and
a processing element, configured to;
generate a first AoA estimation of a first Bluetooth signal received by a first antenna subset;
cause the switching circuit to deselect at least one antenna from the first antenna subset to form a second antenna subset, based at least partly on the first AoA estimation;
generate a second AoA estimation of a second Bluetooth signal received by the second antenna subset; and
cause the switching circuit to add at least one antenna that is not in the second antenna subset based at least partly on the second AoA estimation, to form a third antenna subset.

18. The wireless device of claim 17, wherein the first and second Bluetooth signals are Bluetooth Low Energy (BLE) signals including Constant Time Extension (CTE).

19. The wireless device of claim 17, wherein the transceiver has a single radio configuration, and the switching circuit is configured to couple one antenna to the transceiver at a time to form the antenna subset.

20. The wireless device of claim 17, the processing element is further configured to:
generate a third AoA estimation of a third Bluetooth signal received by the third antenna subset.

21. The wireless device of claim 17, wherein the antenna cluster is configured to be one of: a linear pattern, a circular pattern, and an oval pattern.

* * * * *